INVENTOR.
ERVIN LESHNER
BY
Caesar and Rivise
ATTORNEYS.

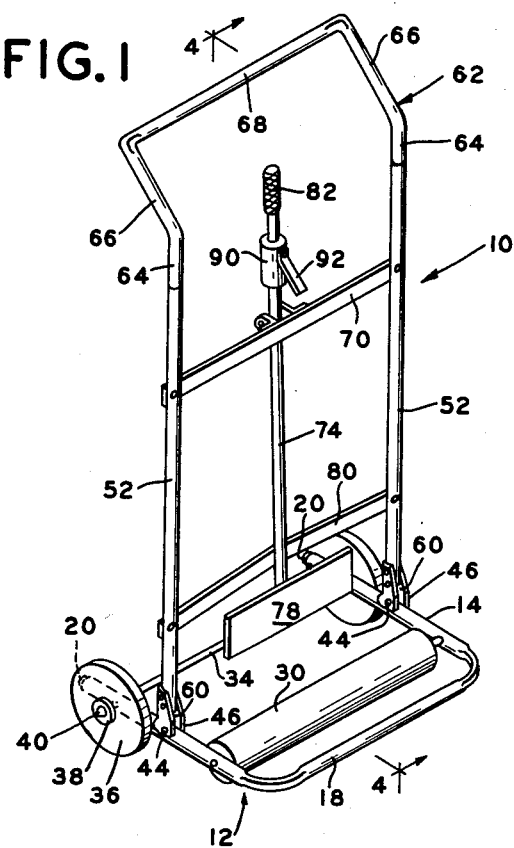
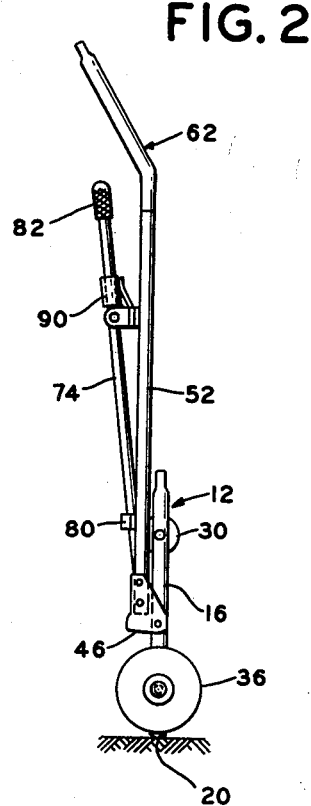
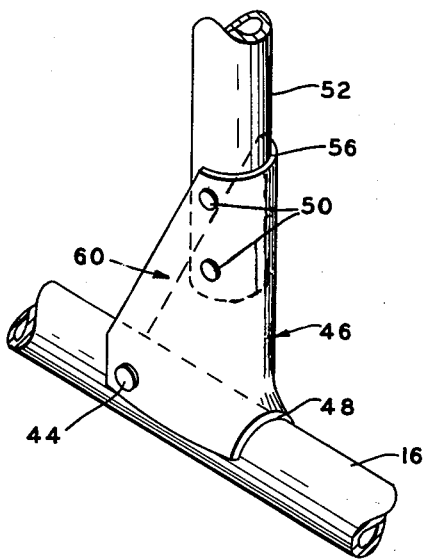
Nov. 26, 1963 — E. LESHNER — 3,112,042
HAND CART
Filed May 19, 1961 — 2 Sheets-Sheet 1
FIG. 1
FIG. 2
FIG. 3
INVENTOR.
ERVIN LESHNER
BY Caesar and Rivise
ATTORNEYS Nov. 26, 1963  E. LESHNER  3,112,042
HAND CART
Filed May 19, 1961  2 Sheets-Sheet 2

United States Patent Office 3,112,042
Patented Nov. 26, 1963

3,112,042
HAND CART
Ervin Leshner, Philadelphia, Pa., assignor to Falco Products Co., Philadelphia, Pa., a corporation of Pennsylvania
Filed May 19, 1961, Ser. No. 111,236
2 Claims. (Cl. 214—511)

This invention relates generally to a hand cart and, more particularly, to a hand cart that is easily folded for storage and that has other novel features to facilitate its use.

Hand carts are in common usage for moving items that are too heavy or bulky to carry. They find common usage in hotels for moving luggage and in industry for moving barrels. The present invention is an improvement in such a hand cart.

Accordingly, it is an object of this invention to provide a new and improved hand cart.

It is another object of this invention to provide a hand cart that is readily collapsible.

It is a further object of this invention to provide a hand cart that includes a pushing means for removing items placed on the cart.

It is yet a further object of this invention to provide a hooking means for securing barrels or other items on the cart.

These and other objects are accomplished by providing a hand cart comprising a U-shaped handle, a U-shaped base pivotally secured to the handle, a pair of wheels rotatively secured to the base, and a pivotable pushing means with hooking means operatively associated with said handle.

Other objects and many of the attendant advantages of this invention will be readily appreciated as the same becomes better understood by reference to the following detailed description when considered in connection with the accompanying drawings wherein:

FIG. 1 is a perspective view of the hand cart of this invention;

FIG. 2 is a side elevational view showing the cart of FIG. 1 in its folded condition;

FIG. 3 is a fragmentary enlarged perspective view of the brace joining the handle to the base, taken generally rearwardly thereof;

Figure 4:
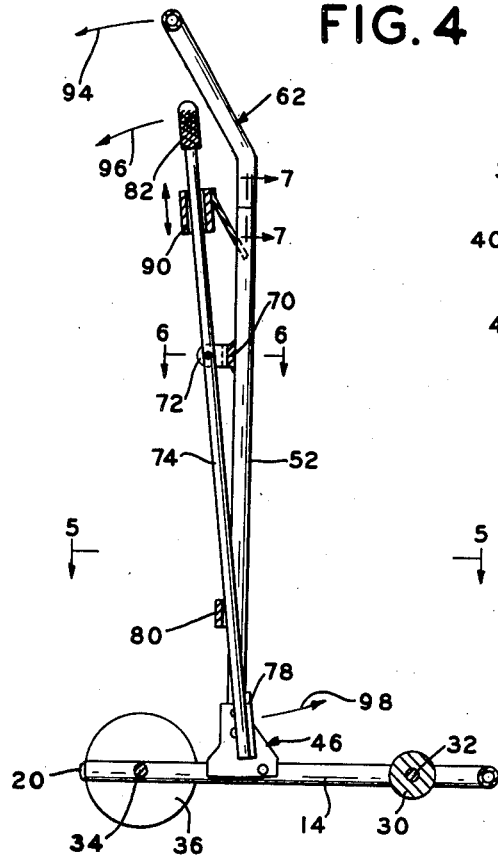
FIG. 4 is a sectional view taken along line 4—4 of FIG. 1.
Figure 5:
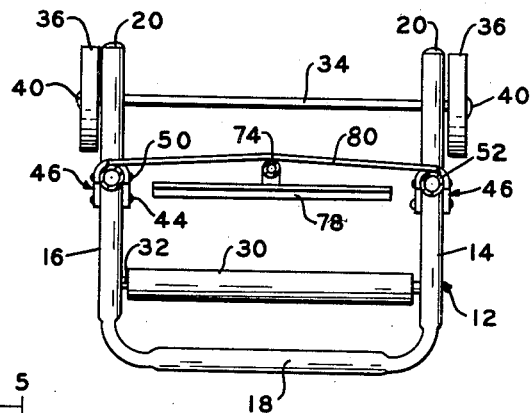
FIG. 5 is a sectional view taken along line 5—5 of FIG. 4.

Referring now in greater detail to the various figures of the drawings wherein similar reference characters refer to similar parts, a hand cart embodying the present invention is generally shown at 10 in FIG. 1. Device 10 basically comprises a generally U-shaped base 12 having legs 14 and 16 and bridging section 18. The base is made from tubular metal, such as steel or aluminum. The open ends of tubular legs 14 and 16 are capped with rounded rubber plugs 20.

Rotatively secured between legs 14 and 16 is roller 30 mounted on axle 32 secured in said legs. Roller 30 is of a larger diameter than legs 14 and 16 and, as shown in FIG. 4, extends both below and above the legs 14 and 16. Secured to legs 14 and 16 near the open end of U-shaped base 12 is a shaft 34. Wheels 36, having associated washers 38 and securing caps 40, are rotatively mounted on axle 34. It is to be noted that in use, base 12 will be inclined forwardly because wheels 36 are of a larger diameter than roller 30, which may be dispensed with in some applications. The handle, however, should be either generally vertically disposed or inclined slightly rearwardly.

Pivotally secured to legs 14 and 16 by pins 44 (FIG. 3) are braces 46. The lower portion 48 of braces 46 is semi-cylindrically shaped to conform to the upper contour of legs 14 and 16. Fixedly secured to the upper portion of braces 46 by rivets 50 are vertical tubular legs 52 which terminate in handle 62. Braces 46 also have a semi-cylindrical upper portion 56 to conform to the contour of legs 52. Upper portion 56 is extended downwardly to define a hollow portion 60 for receiving legs 14 and 16 of base 12 when the cart is in its folded condition.

Figure 7:
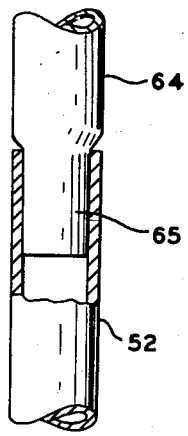
FIG. 7 is an enlarged sectional view taken along line 7—7 of FIG. 4, with certain parts shown in perspective for clarity.

Secured to the upper ends of legs 52 is tubular handle 62. Handle 62 is generally U-shaped, with lower portions 64 of legs 66 having narrow ends 65 which frictionally telescope in legs 52 (FIG. 7). The upper portions of legs 66 are, however, inclined from the vertical as shown in FIG. 4. Bridging section 68 connects the upper portions of legs 66.

Figure 6:
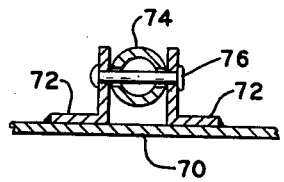
FIG. 6 is an enlarged fragmentary sectional view taken along line 6—6 of FIG. 4.

A horizontal cross-bar 70 is connected to the upper portions of legs 52. Angle brackets 72 (FIG. 6) are welded to bar 70 at its center. A generally vertical tube or shaft 74 is pivotally secured between angle brackets 72 by pin 76. Secured to the lower end of tube 74 is a flat rectangular plate 78. A second horizontal cross-bar 80 is connected to the lower portions of legs 52. Bar 80 is bent back at its midpoint, so as to provide a recess for receiving the hanging tube 74. The top of tube 74 is provided with a cylindrical handle 82. This handle is preferably made of rubber, and has a knurled surface to provide an easier grip. Slidingly and frictionally engaging tube 74 is a sleeve 90 having incliningly depending finger 92 riveted thereto. The top part of the finger is flush with sleeve 90 at the rivet point, with the lower part being angled outwardly to function as hooking means as will be discussed hereinafter.

In operation, the items to be moved are placed on base 12. The cart is then tilted backwardly in the direction of arrow 94 (FIG. 4). The cart is then moved to the desired place on wheels 36. When the desired location is reached, handle 82 is pulled in the direction of arrow 96, which causes plate 78 to move in the direction of arrow 98. The plate then pushes the items off the cart, and avoids the necessity of lifting them off, as with other carts. Roller 30 aids in the sliding of the packages off the cart, but is not required. Roller 30 further serves the function of supporting base 12 when packages are being loaded on the cart.

Sleeve 90, with its dependent finger 92, constitutes hook means to be used when barrels are loaded on the cart. After a barrel is placed in an upright position on the base, sleeve 90 is slid down tube 74 until finger 92 engages the lip of the barrel. Sleeve 90 may be held in a given position either by frictional engagement or by other means such as a set screw arrangement. This holds the barrel securely in place and obviates the necessity of the worker holding the barrel.

Another feature of the invention is the foldability of the cart. When the cart is not in use, base 12 is pivoted ninety degrees in a counterclockwise direction about pin 44 (as viewed in FIG. 1) until legs 12 and 14 are engaged in recesses 60 of brackets 46. This lifts wheels 36 off the ground (FIG. 2), and the cart then rests on the ends 20, such as rubber or plastic plugs, of legs 14 and 16. The cart is now prevented from rolling away. As shown in FIG. 2, the cart is very compact in its folded condition, and can easily be stored in any convenient location.

It is to be additionally noted that a barrel or can may be simply loaded upon the cart of the present invention and easily latched by finger 92. This is accomplished by placing the barrel on base 12. The handle is then tilted forwardly so that finger 92 latches about the upper edge of the peripheral wall of the barrel. The handle is then pulled back to its initial position, and in so doing carries the latched barrel with it. Thus, the latched barrel is now held against the handle and accordingly the cart is now loaded and may be moved where desired.

Obviously many modifications and variations of the present invention are possible in the light of the above teachings. It is, therefore, to be understood that within the scope of the appended claims, the invention may be practiced otherwise than as specifically described.

I claim:

1. A hand cart comprising a handle and a generally U-shaped tubular base, said U-shaped base including a pair of parallel leg members and an integral bridging section being forward of said handle, wheels rotatably mounted on said base near its rearward, open end, said handle including a pair of tubular parallel legs, one each of said legs being pivotally mounted on one leg of said U-shaped base, a generally U-shaped member having legs frictionally telescoped in the upstanding tubular legs of said handle, a shaft pivotally associated with said handle, a sleeve slidably mounted on said shaft, said sleeve having a dependent article-engaging finger, and a plate mounted on the lower end of said shaft, whereby articles placed on said cart can be removed by the pivoting of said shaft to force said plate against said articles.

2. The hand cart of claim 1 and further including a resilient plug placed in the open end of each leg of said tubular base, whereby said tubular base can be pivoted against the legs of said handle for upright storage and said resilient plugs will engage the floor on which said cart is stored thereby preventing any sliding of said cart.

References Cited in the file of this patent

UNITED STATES PATENTS

| | | |
|---|---|---|
| 528,443 | Randall | Oct. 30, 1894 |
| 2,212,053 | Smith | Aug. 20, 1940 |
| 2,277,302 | Chenette | Mar. 24, 1942 |
| 2,476,202 | Lozon | July 12, 1949 |
| 2,564,248 | Chenette | Aug. 14, 1951 |
| 2,682,348 | Stumphauzer | June 29, 1954 |
| 2,721,085 | Powell | Oct. 18, 1955 |
| 2,780,375 | Marcusson | Feb. 5, 1957 |
| 2,838,193 | Statton | June 10, 1958 |